(12) United States Patent
Linck et al.

(10) Patent No.: US 8,128,717 B2
(45) Date of Patent: Mar. 6, 2012

(54) MECHANICALLY DRIVEN CENTRIFUGAL PYROLYZER

(75) Inventors: Martin Brendan Linck, Mount Prospect, IL (US); Phillip Vann Bush, Bartlett, IL (US)

(73) Assignee: Gas Technology Institute, Des Plaines, IL (US)

( * ) Notice: Subject to any disclaimer, the term of this patent is extended or adjusted under 35 U.S.C. 154(b) by 594 days.

(21) Appl. No.: 12/325,370

(22) Filed: Dec. 1, 2008

(65) Prior Publication Data

US 2010/0132258 A1    Jun. 3, 2010

(51) Int. Cl.
| | |
|---|---|
| *B01J 7/00* | (2006.01) |
| *H01M 8/06* | (2006.01) |
| *C01B 3/36* | (2006.01) |
| *C01B 6/24* | (2006.01) |
| *C01B 3/02* | (2006.01) |
| *C01B 3/24* | (2006.01) |
| *C10J 3/46* | (2006.01) |

(52) U.S. Cl. ....... 48/197 R; 48/61; 423/644; 423/648.1; 423/650

(58) Field of Classification Search ........... 48/61, 197 R
See application file for complete search history.

(56) References Cited

U.S. PATENT DOCUMENTS

| | | | | | |
|---|---|---|---|---|---|
| 2,152,411 | A | * | 3/1939 | Isendahl | 48/64 |
| 4,854,937 | A | * | 8/1989 | Meyer et al. | 44/280 |
| 6,830,597 | B1 | * | 12/2004 | Green | 48/209 |
| 2002/0119089 | A1 | * | 8/2002 | Masemore et al. | 423/449.7 |
| 2005/0100496 | A1 | * | 5/2005 | Blaschke et al. | 423/418.2 |
| 2005/0173237 | A1 | | 8/2005 | Bridgwater et al. | |

FOREIGN PATENT DOCUMENTS

JP    2001098275 A  *  4/2001

* cited by examiner

*Primary Examiner* — Matthew Merkling
(74) *Attorney, Agent, or Firm* — Mark E. Fejer

(57) ABSTRACT

An apparatus for fast pyrolysis of biomass and other solid organic materials including a vertically oriented cylindrical vessel having a solids outlet proximate the bottom thereof, a vapor outlet, a top wall forming at least one opening, and an adjacent heated side wall. Disposed within the cylindrical vessel and extending through the at least one opening in the top wall is a rotor having a rotatable shaft coincident with the longitudinal axis of the cylindrical vessel to which is attached at least one substantially vertically oriented blade having one edge connected directly or indirectly with the rotatable shaft and having an opposite edge spaced apart from the heated side wall, whereby a non-radial, preferably tangential, force is imparted on the feedstock in the cylindrical vessel. Also disclosed is a method for fast pyrolysis of biomass and other solid organic materials.

9 Claims, 4 Drawing Sheets

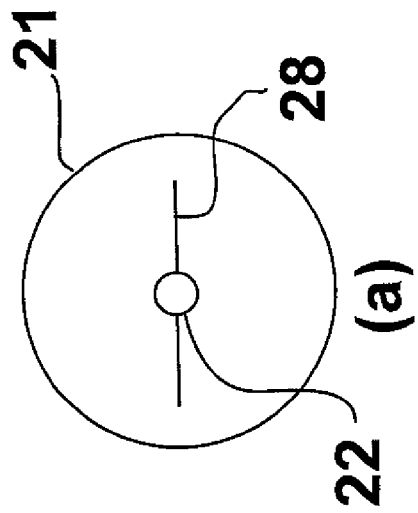
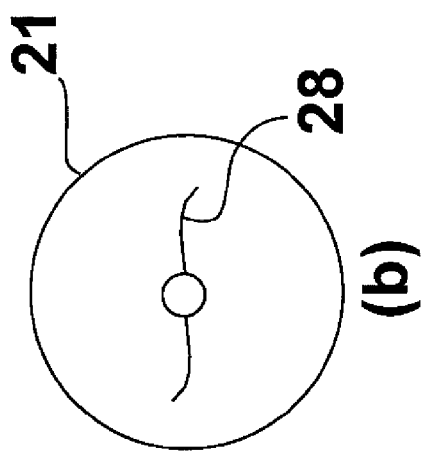
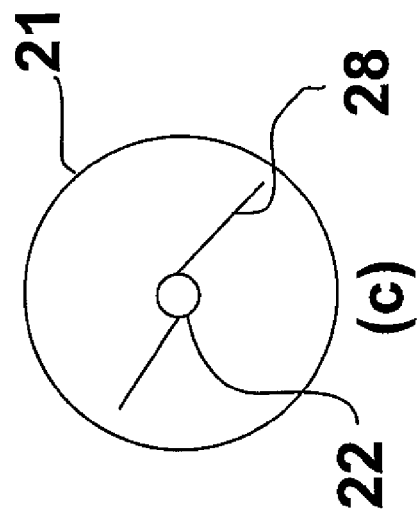
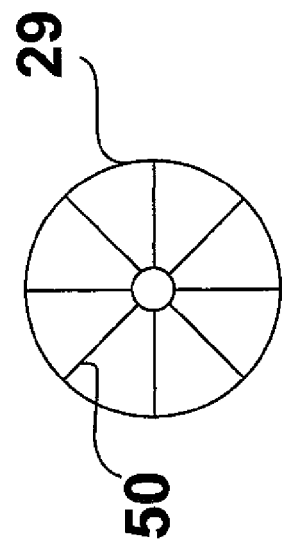
Fig. 4
Fig. 5

MECHANICALLY DRIVEN CENTRIFUGAL PYROLYZER

The U.S. Government has a paid-up license in this invention and the right in limited circumstances to require the patent owner to license others on reasonable terms as provided for by the terms of Contract No. DE-FG36-01GO11082 awarded by the U.S. department of Energy.

BACKGROUND OF THE INVENTION

1. Field of the Invention

This invention relates to a method and apparatus for ablative pyrolysis of biomass to form condensable liquid products having properties, such as viscosity and energy density, that make the products useful as fuel oil, or as a source of chemicals, or for the production of chemicals and/or derived products.

2. Description of Related Art

In general, pyrolysis is a chemical process in which a compound (feedstock) is converted to one or more products by heat. Most pyrolysis processes utilize heat transfer from a hot gas and/or hot solid, such as sand, to the feedstock and rely upon the particles of the feedstock being small to achieve rapid heating. This process is typically carried out in entrained flow, transported, fluid, or circulating beds.

Fast pyrolysis is a process in which a solid feedstock, such as wood, agricultural waste, or other organic based material is rapidly heated, producing a solid product and vapor, the latter of which may then be condensed to form a liquid product. In the fast pyrolysis of biomass, which is generally defined as renewable organic materials, such as wood, agricultural crops or wastes, and municipal wastes, the liquid product is generally referred to as bio-oil, biocrude, and pyrolysis oil, although other terms also occur in the literature. This liquid product, which will be referred to herein as pyrolysis oil, is a complex liquid comprising water and a wide range of hydrocarbons and carbohydrates produced by the thermal breakdown of lignin, cellulose, and hemicellulose in the biomass. Recent studies have shown that pyrolysis oil may function as a substitute for oils derived from petroleum in certain applications, and can be upgraded using existing techniques to produce products similar to gasoline, diesel fuel, and heavy oil, with high overall thermal efficiencies (on the order of 50% for gasoline-range hydrocarbon products). Fast pyrolysis is distinct from slow pyrolysis and is characterized by very rapid heating of the feedstock followed by rapid cooling and condensation of the resulting vapor stream. Fast pyrolysis has been shown to convert as much as 75% by mass of the original biomass into pyrolysis oil, with the remainder being converted into non-condensable gases and a solid product, i.e. primarily char. On the other hand, slow pyrolysis produces a greater proportion of solid product and involves much slower heating of the feedstock. Slow pyrolysis may convert about 30% by mass of the biomass to char, with the remainder being converted mostly to non-condensable vapors. Only a small amount of condensable liquid product is obtained during slow pyrolysis.

Ablative pyrolysis is the process of applying high applied mechanical pressure or centrifugal force to particles of feedstock which are moved on a hot surface having a temperature of about 400° C. or higher. This process has the advantages of more effective heat transfer, minimal use of inert or transport gas, and the use of larger feedstock particles than are typically employed in fluid or circulatory beds. Known systems for ablative pyrolysis include vortex pyrolyzers in which the feedstock particles are accelerated to high speeds by the use of a gas jet. Once the feedstock particles are brought into contact with a curved surface, centrifugal forces ensure that the biomass remains in contact with the surface long enough to effect ablative pyrolysis. However, vortex pyrolysis requires very small particles of feedstock, which is costly and inefficient, because grinding of the feedstock into fine powders requires considerable amounts of energy. In experiments on vortex pyrolyzers reported in the literature, the heated surface was subject to erosion due to the initial point of impingement of the jet being subjected to severe abrasion by the entrained feed material in the jet. In addition, as the feedstock particles interacted with the heated wall, they rapidly lost momentum, which reduced the inertial forces that brought the particles and the wall into contact, and the particles tended to exit the chamber without being fully pyrolyzed. U.S. Patent Application Publication No. 2005/0173237 A1 to Bridgwater et al. teaches an ablative thermolysis reactor, shown in FIG. 1, comprising a cylindrical reaction vessel 12 having a heated sidewall 10 and at least one rotatable surface 11 connected with a drum 13 disposed within the cylindrical vessel having an axis of rotation coincident with the longitudinal axis of the cylindrical reaction vessel wherein the rotatable surface is positioned relative to the ablative surface, i.e. the cylindrical reaction vessel side wall, such that the feedstock is pressed against the ablative surface and moved along the ablative surface by the rotatable surface to thermolyse the feedstock. The Bridgwater et al. publication further teaches that the distance between the rotatable surface 11 and the heated side wall, although adjustable, is less than 1 mm. It will be appreciated by those skilled in the art that pressing of the feedstock against the heated side wall corresponds with the application of a radial force upon the feedstock as indicated by arrow 14. Although this approach addresses the issue of maintaining contact between the feedstock particles and the ablative surface, there exists the potential for a buildup of particles between the rotatable surface and the ablative surface which, in addition to preventing a portion of the particles from ever contacting the ablative surface, could lead to overload or jamming of the device. Furthermore, because the apparatus relies upon maintaining continuous pressing of the particles against the ablative surface as the rotatable surface is rotated, the range of particles which may be processed during any single period of operation is limited by the distance between the rotatable surface and the ablative surface, i.e. less than 1 mm. Thus, adjustment of the distance between the rotatable surface and the ablative surface is necessary to accommodate increases or decreases in feedstock particle sizes. In addition, in one embodiment of the reactor of the Bridgwater et al. publication in which the cylindrical reaction vessel is vertically oriented, input of the feedstock into the vessel is through one or more openings in the side wall as is output of the vapor produced by the ablative pyrolysis. One of the drawbacks of this arrangement is the tendency of unreacted feedstock particles, which are being pressed against the heated side wall, to pass through the outlet opening(s) before having been completely pyrolyzed.

SUMMARY OF THE INVENTION

It is, thus, one object of this invention to provide an ablative pyrolysis apparatus and method which mitigates the disadvantages and shortcomings of the known ablative pyrolysis methods and systems.

This and other objects of this invention are addressed by an apparatus for fast pyrolysis of biomass comprising a vertically oriented cylindrical vessel having a solids outlet proximate the bottom thereof, a vapor outlet, a top wall forming at least one opening, and an adjacent heated side wall. The apparatus further comprises a solids feed conduit in fluid communication with the interior of the cylindrical vessel such that the solid feedstock is introduced into the cylindrical vessel proximate the top wall. Disposed within the cylindrical vessel and extending through the at least one opening in the top wall is a rotor comprising a rotatable shaft coincident with the longitudinal axis of the cylindrical vessel to which is attached at least one blade or paddle having one edge connected directly or indirectly with the rotatable shaft, having an opposite edge spaced apart from the heated side wall, and having a feedstock contact surface plane intersecting with, or tangential to, the rotating shaft. With the plane of the feedstock contact surface intersecting the rotating shaft, the blade or paddle is unable to apply direct radial force to the feedstock and able to apply substantially only a direct tangential, or non-radial, force to the feedstock. Thus, contact between the solid feedstock and the heated side wall is achieved substantially only as the result of propulsion or pushing of the solid feedstock in a substantially tangential direction by the at least one blade. It will be appreciated that as the amount of feedstock being pushed by the blade or paddle increases, the feedstock may move along, or parallel to, the plane of the blade or paddle toward the heated wall. However, at no time is any direct radial force applied by the blade or paddle to actively press the feedstock against the heated wall. Upon contact with the side wall, the solid feedstock continues to move along the side wall until ablative pyrolysis is effected, producing hot pyrolysis vapor and char. The hot pyrolysis vapor and char are removed from the cylindrical vessel after which the hot pyrolysis vapor is rapidly cooled, resulting in condensing of the vapor to a liquid pyrolysis oil.

BRIEF DESCRIPTION OF THE DRAWINGS

These and other objects and features of this invention will be better understood from the following detailed description taken in conjunction with the drawings wherein:

FIG. 4 is a transverse schematic diagram of the ablative pyrolyzer shown in FIG. 1 taken along the line IV-IV;

FIG. 5 is a transverse schematic diagram of the ablative pyrolyzer shown in FIG. 1 taken along line V-V.

DETAILED DESCRIPTION OF THE PRESENTLY PREFERRED EMBODIMENTS

Figure 3:
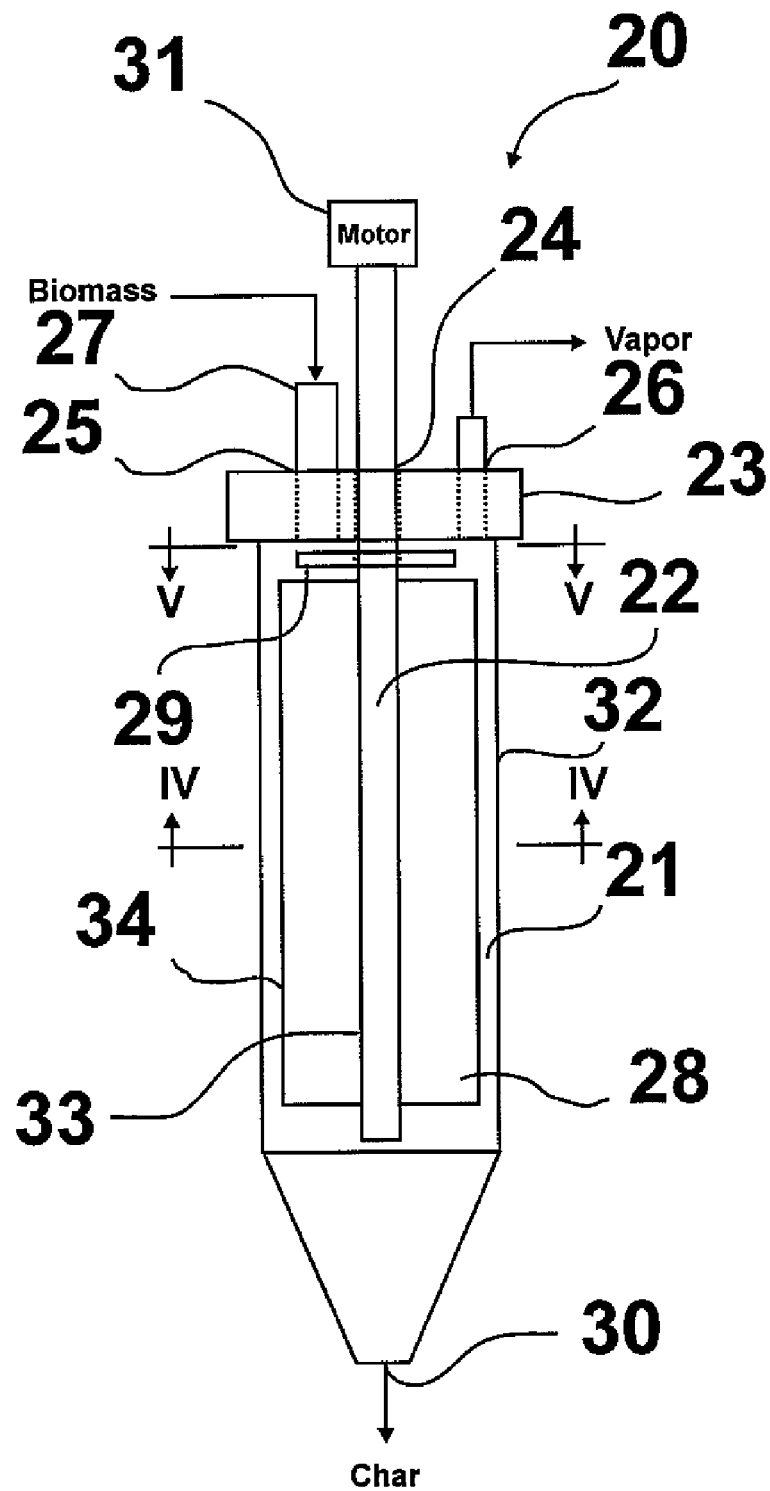
FIG. 3 is a schematic diagram of an ablative pyrolyzer in accordance with one embodiment of this invention.

The invention claimed herein is an ablative pyrolyzer 20 for fast pyrolysis of biomass and other solid organic materials as shown in FIG. 3 comprising a vertically oriented cylindrical pyrolyzer vessel 21 having a solids outlet 30 proximate the bottom thereof, a vapor outlet 26, a top wall 23 forming at least one opening, and an adjacent heated side wall 32. Although this invention will be described with reference to biomass feedstock, it is to be understood that the invention is suitable for use with any solid organic-based material able to undergo pyrolysis, and such uses are deemed to be within the scope of this invention. Disposed within the cylindrical vessel and extending through opening 24 is a rotor comprising rotatable shaft 22 coincident with the longitudinal axis of the cylindrical vessel. Rotatable shaft motor 31 is operably connected with the rotor for rotating rotatable shaft 22. At least one blade or paddle 28 is connected directly or indirectly, i.e. using intermediate connection means, with rotatable shaft 22 along edge 33 parallel with the longitudinal axis of the cylindrical vessel in accordance with one embodiment of this invention. Blade 28 is sized such that edge 34 opposite to edge 33 is spaced apart from side wall 32. In accordance with one embodiment of this invention, blades 28 are connected with the rotatable shaft in an orientation that is non-parallel with respect to said longitudinal axis. In accordance with one embodiment of this invention as shown in FIG. 4(*a*), blade or paddle 28 is a planar structure. It will, however, be appreciated that a variety of blade profiles may be employed. In accordance with one embodiment of this invention as shown in FIG. 4(*b*), blade 28 has a curved shape.

As shown in FIG. 4(*a*), blades 28 extend radially outward from rotatable shaft 22. However, orientations of the blades at an angle with respect to the radius of the rotatable shaft as shown in FIG. 4(*c*) may be more advantageous.

Figure 2:
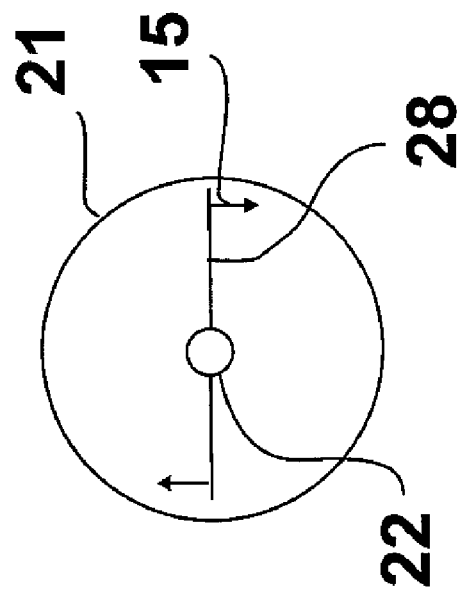
FIG. 2 is a simplified transverse schematic diagram of an ablative pyrolyzer in accordance with one embodiment of this invention.
Figure 1:
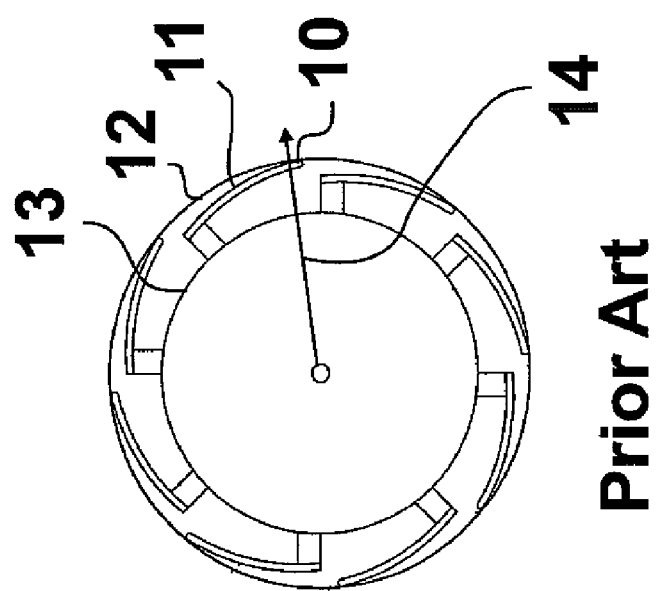
FIG. 1 is a schematic diagram of a known ablative pyrolyzer.

The design and direction of rotation of the blade or paddle is such that no direct radial force is applied to the solids feed in the cylindrical vessel. As shown in FIG. 2, the direct force applied to the solids feed, as indicated by arrows 15, is a non-radial force, preferably a tangential force. This is in contrast to the teachings of U.S. Patent Application Publication No. 2005/0173237 A1 to Bridgwater et al. discussed herein above in which the solids feed is continuously physically pressed by the direct application of a radial force, as indicated by arrow 14 in FIG. 1, by the rotating surface against the heated side wall to ensure sufficient contact time to effect pyrolysis, thus providing a continuous direct pressure on the solids feed disposed in the gap between the side wall and the rotating surface. Also as shown in FIG. 1, the rotatable surface 11 is oriented toward heated side wall 10, thereby ensuring that any particles of solids feed coming between the rotatable surface and the heated side wall will be pressed, by virtue of the application of a radial force, against the heated side wall. In contrast thereto, the rotatable surface, i.e. blade or paddle 28, of the apparatus of this invention, as shown in FIG. 2, is arranged such that the plane of the rotatable surface intersects with the rotatable shaft 22.

Figure 6:
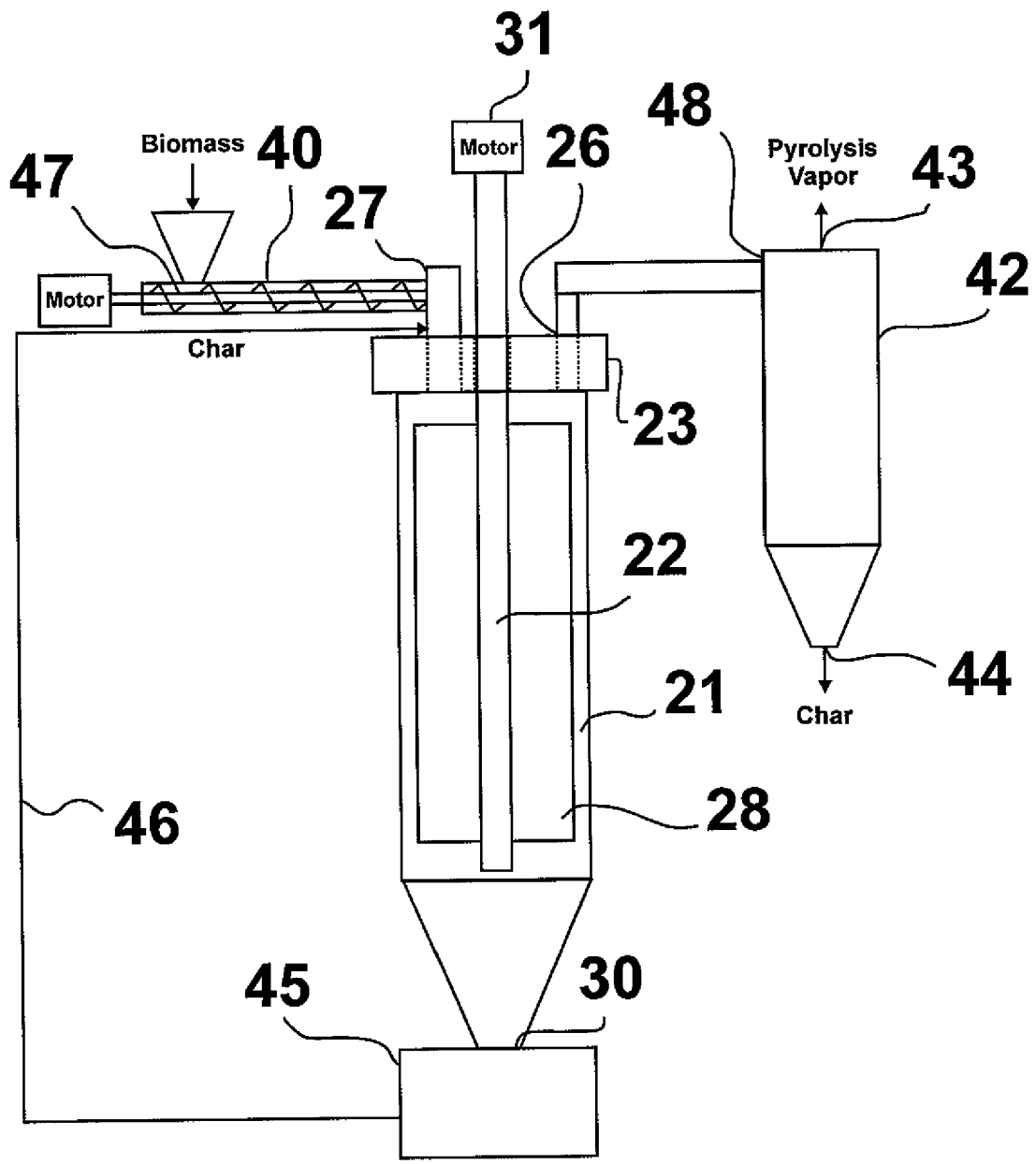
FIG. 6 is a schematic diagram of a system for fast pyrolysis of biomass and other solid feeds which includes an ablative pyrolyzer in accordance with one embodiment of this invention.

To provide the solids feed to the cylindrical pyrolyzer vessel, solids feed conduit 27, which is in fluid communication with the interior of the cylindrical pyrolyzer by way of solids feed opening 25 formed by top wall 23, is provided. It will be appreciated by those skilled in the art that numerous methods for providing solid feed materials to a vessel are known and such methods are deemed to be within the scope of this invention. In accordance with one embodiment of this invention, as shown in FIG. 6, solids feed transport to cylindrical pyrolyzer vessel 21 is provided by solids feed system 40 comprising at least one auger 47 in fluid communication with solids feed conduit 27. Auger systems are particularly suitable because the rate at which the solids feed enters the pyrolyzer vessel can easily be controlled by changing the speed at which the auger rotates. Once inside the pyrolyzer vessel, the solids feed is accelerated by the rotation of rotatable shaft 22 and blades 28, thereby propelling the solids feed against the heated vessel side wall. The rate of acceleration may be regulated easily by changing the rotation speed of the rotatable shaft.

In accordance with one embodiment of this invention, the pyrolyzer vessel interior facing surface of the heated side wall may be provided with one or more grooves which may increase the contact time between the solids feed and the heated side wall to provide more complete pyrolysis of the solids feed. In accordance with one embodiment, the surface is provided with a spiral groove extending around the vessel interior perimeter.

As the solids feed is introduced through solids feed inlet 25 into the vertically oriented cylindrical pyrolyzer vessel, the feed begins almost immediately to descend toward the bottom of the vessel. As a result, it may be necessary to ensure that the feed does not descend too far into the vessel before being propelled outwardly toward the heated side wall. This may be achieved in accordance with one embodiment of this invention with a horizontally oriented plate 29 connected with rotatable shaft 22 proximate top wall 23 as shown in FIG. 3 onto which the feed would drop prior to rotational acceleration by the rotor, i.e. rotatable shaft and blades. It may also be desirable to control the path taken by the feed as it contacts the heated side wall. To this end, in accordance with one embodiment of this invention, horizontal plate 29 may be contoured to provide a plurality of radially extending channels. In accordance with another embodiment of this invention, horizontally oriented plate 29 is provided with a plurality of guide rails 50 by which the top surface of the plate is divided into radially extending segments.

As previously indicated, upon contact with the heated side wall, the solids feed is broken down, i.e. pyrolyzed, to form a hot pyrolysis vapor and char. In accordance with one embodiment of this invention, the side wall is heated to a temperature in the range of about 400° C. to about 700° C. As the feed is pyrolyzed, the hot pyrolysis vapor exits the pyrolysis vessel through vapor outlet 26 formed by top wall 23 and the solid char, together with any unprocessed feed, drops to the bottom of the vessel from which it is removed by means of char outlet 30. In accordance with one embodiment of this invention as shown in FIG. 6, solids receiving vessel 45 is sealingly connected with char outlet 30 of the cylindrical pyrolysis vessel wherein the char and any unprocessed feed is collected without allowing hot pyrolysis vapors generated during the ablative pyrolysis process to escape. In accordance with one embodiment of this invention, at least a portion of the char and any unprocessed feed collected within the solids receiver vessel may be recycled by way of solids recycle line 46 to solids feed conduit 27 for reintroduction into the pyrolyzer vessel in order to react the feed more completely. This approach may be particularly useful if a smaller pyrolyzer vessel is desired as part of a more compact pyrolysis system.

Although char generated during the pyrolysis process is removed from the pyrolyzer vessel through the char opening proximate the bottom of the pyrolyzer vessel, the hot pyrolysis vapors may still contain fine particles of char. Pyrolysis oil is inherently unstable and tends to polymerize over time. This polymerization is accelerated by the presence of char particles, which catalyze reactions in the oil. Thus, these char particles must be removed from the hot pyrolysis vapors in order to increase the chemical stability of the pyrolysis oil product. This may be achieved in accordance with one embodiment of this invention by passing the pyrolysis gas through a solids separation vessel 42 as shown in FIG. 6. Solids separation vessel 42 comprises a hot pyrolysis vapor inlet 48 in fluid communication with vapor outlet 26 of pyrolyzer vessel 21, a reduced pyrolysis vapor outlet 43 and a char outlet 44. In accordance with one embodiment of this invention, the solids separation vessel is a cyclone separator in which particles above a certain diameter are removed from the pyrolysis vapor. Further filtration using ceramic filters or other filters suitable for use at high temperatures may be necessary to further reduce the char concentration in the pyrolysis vapor. After removal of the char particles from the hot pyrolysis vapors, the vapor may then be cooled to condense the liquid pyrolysis oil. Non-condensable gases and char may be combusted to provide at least a portion of the heat required to heat the side wall of the cylindrical pyrolysis vessel.

In accordance with one embodiment of the method of this invention, a solid organic material is introduced into a vertically oriented cylindrical vessel having a heated side wall proximate the top end of the cylindrical vessel. A rotor coincident with a longitudinal axis of the cylindrical vessel is rotated, propelling the solid organic material in a non-radial direction against the heated side wall, forming a hot pyrolysis vapor and solids comprising char. The hot pyrolysis vapor and char are then removed from the cylindrical vessel. In accordance with one embodiment of this invention, the char is removed through the bottom of the cylindrical vessel and at least a portion thereof recycled into the cylindrical vessel proximate the top end thereof. In accordance with one embodiment of this invention, the hot pyrolysis vapor may be introduced into a solids separator vessel, such as a cyclone, thereby separating the solids in the hot pyrolysis vapor from the hot pyrolysis vapor. After removal of the hot pyrolysis vapor from the cylindrical vessel, the vapor may be condensed, forming a liquid pyrolysis oil. In accordance with one embodiment of this invention, non-condensable gases in the hot pyrolysis vapor and/or at least a portion of the char may be used to heat the heated side wall.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A method for fast pyrolysis of solid organic materials comprising the steps of:
    introducing a solid organic material into a vertically oriented right circular cylindrical vessel having a heated side wall proximate a top end of said cylindrical vessel;
    rotating a rotor coincident with a longitudinal axis of said cylindrical vessel whereby said solid organic material is pushed laterally in a non-radial direction against said heated side wall and pyrolyzed, forming a hot pyrolysis vapor and solids comprising char; and
    removing said hot pyrolysis vapor from said cylindrical vessel.

2. The method of claim 1, wherein said char is removed through a bottom of said cylindrical vessel and at least a portion of said char is recycled into said cylindrical vessel proximate said top end of said cylindrical vessel.

3. The method of claim 1, wherein said heated side wall is at a temperature greater than about 400° C.

4. The method of claim 3, wherein said heated side wall is at a temperature in a range of about 400° C. to about 700° C.

5. The method of claim 1, wherein said hot pyrolysis vapor is introduced into a solids separator vessel, resulting in separation of solids in said hot pyrolysis vapor from said hot pyrolysis vapor.

6. The method of claim 5, wherein said solids separation vessel is a cyclone.

7. The method of claim 5, wherein said hot pyrolysis vapor is condensed, forming a liquid pyrolysis oil.

8. The method of claim 1, wherein at least one of non-condensable gases in said hot pyrolysis vapor and at least a portion of said char is used to heat said heated side wall.

9. The method of claim 1, wherein said organic material is biomass.

\* \* \* \* \*